J. VADAY.
ANTISKIDDING DEVICE.
APPLICATION FILED JAN. 23, 1914.
1,105,386.
Patented July 28, 1914.
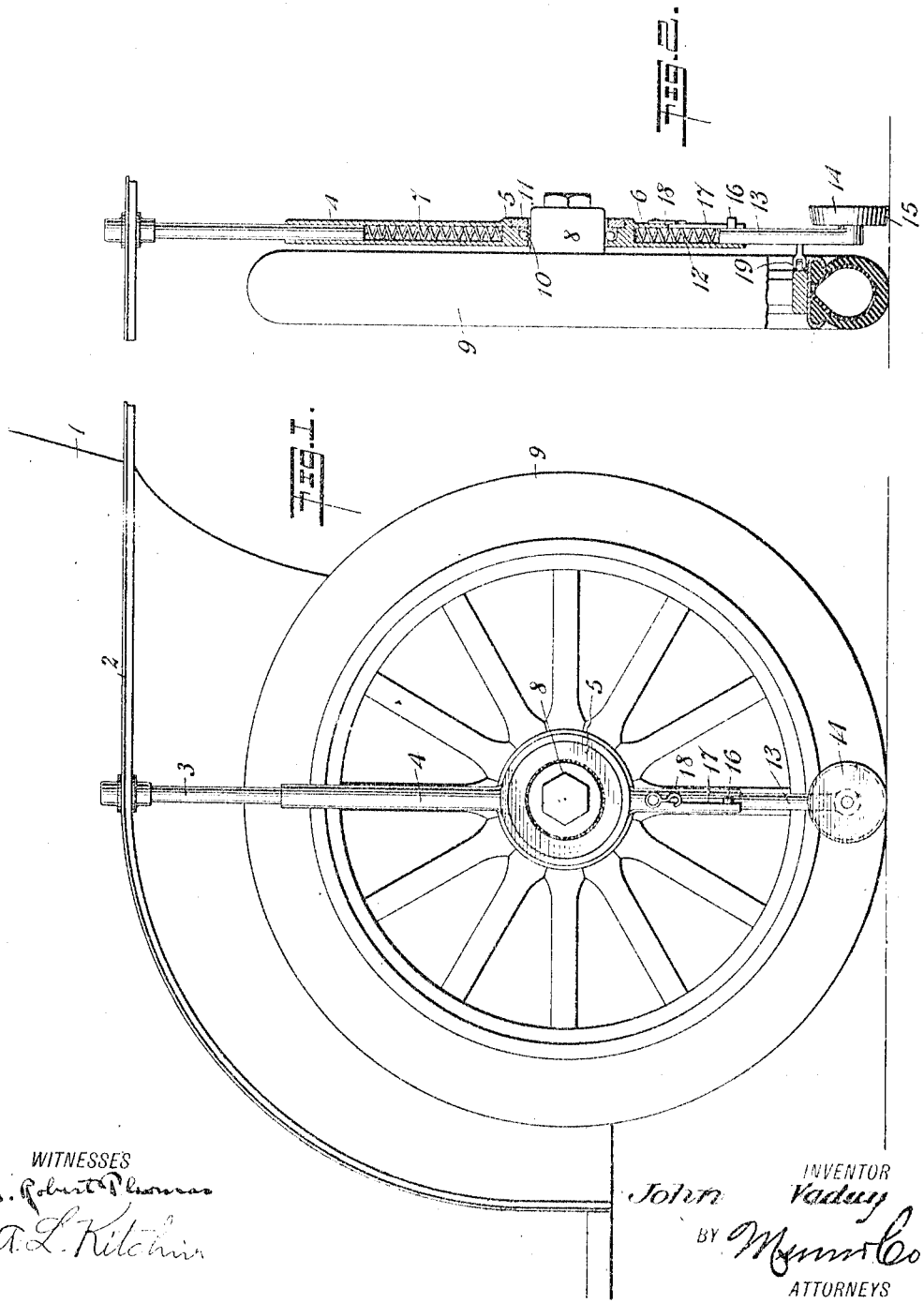

UNITED STATES PATENT OFFICE.

JOHN VADAY, OF RIDGEWOOD, NEW JERSEY.

ANTISKIDDING DEVICE.

1,105,386.

Specification of Letters Patent.

Patented July 28, 1914.

Application filed January 23, 1914. Serial No. 813,833.

*To all whom it may concern:*

Be it known that I, JOHN VADAY, a citizen of the United States, and a resident of Ridgewood, in the county of Bergen and State of New Jersey, have invented a new and Improved Antiskidding Device, of which the following is a full, clear, and exact description.

This invention relates to improvements in anti-skidding devices for vehicles, and has for an object to provide an improved structure which may be thrown into and out of operation whenever desired.

Another object in view is to provide an anti-skidding traction member for the various wheels of a vehicle, and means associated therewith for resiliently pressing the same against the ground.

In carrying out the object of the invention it is to be noted that the device may be secured to any kind of vehicle, as for instance automobiles and other power driven vehicles.

In constructing and applying the antiskidding device the same is provided with a hub portion for fitting over the hub of the wheel of an automobile, and tubular extensions containing suitable springs. One of these extensions co-acts with a retaining member secured to the mud guard or other suitable device on the automobile, and the other extension accommodates a reciprocating bar which carries a traction member, whereby the traction member is resiliently pressed against the ground. Means are provided in connection with the traction member and bars for supporting the same, whereby the traction member may be elevated so as to be out of contact with the ground whenever not needed.

In the accompanying drawings—Figure 1 is a side view of the rear part of an automobile, an embodiment of the invention being associated therewith; and Fig. 2 is a rear view of the structure shown in Fig. 1, certain parts being broken away for better illustrating the construction.

Referring to the accompanying drawings by numeral 1 indicates the body of a suitable vehicle, as for instance an automobile, and 2 the mud guard therefor. Secured to the mud guard 2 is a bar 3 whereby the same is held rigidly in position and against movement except that the same moves up and down with the mud guard. If desired, a bracket or other suitable device could be provided for connecting bar 3 with the body 1 of the automobile. Bar 3 telescopically fits into a tubular member 4 secured rigidly to or formed integral with a hub structure 5, which hub structure has radiating therefrom a second tubular member 6. Tubular member 4 is provided with a spring 7 which is designed to press against hub 5 and bar 3. This sliding connection is desirable as hub 5 and associated parts move only with the hub 8 of wheel 9, while bar 3 moves with the body of the vehicle 1. The function of bar 3 is to prevent the rotation of the hub member 5 and the tubular member 6 and associated parts. The hub member 5 may be of any suitable construction, but is preferably provided with balls 10 and a retaining nut 11. The balls 10 may rest directly against the outer part of hub 8, or if desired may have a suitable cone arranged on hub 8 so as to properly co-act with the balls.

The tubular member 6 is provided with a spring 12 pressing continually against vertical bar 13, which in turn carries a rotatable traction member 14. Traction member 14 is preferably solid, and is preferably formed with a beveled surface 15 so that the outer edge will partially enter the earth when the automobile 1 attempts to skid. In order to properly hold the bar 13 in place, and also member 14, a guiding pin 16 is provided which is movable in slots 17 of the tubular member 6. Pin 16 is also to be utilized for holding member 14 above the ground when the same is not in use. A pivotally mounted hook 18 is connected with the upper part of tubular member 6, and is adapted to be hooked over pin 16 when member 14 is to be held in an elevated position. An anti-friction bracing member 19 is provided on bar 13 which acts against the felly of wheel 9 when the machine 1 attempts to skid. Under ordinary circumstances an anti-friction member could be arranged to touch the felly of wheel 9, or a short distance therefrom, as desired.

What I claim is—

1. In an anti-skidding device of the character described, the combination with a vehicle provided with wheels, of a hub structure fitting over the hub of the wheel, said hub structure being provided with oppositely extending tubular members, a steadying bar connected with said vehicle and telescopically fitting into one of said tubular members for holding the tubular members in proper position, and for preventing a rotation thereof, a reciprocating bar arranged in the other of said tubular members, and an earth engaging member connected with said reciprocating bar.

2. In an anti-skidding device of the character described, the combination with a vehicle provided with wheels, of an encircling member adapted to fit over the hubs of said wheels, a pair of tubular members connected with each of said encircling members and extending in an opposite direction therefrom, a steadying bar telescopically fitting into one of said tubular members, a reciprocating bar fitting into the other of said tubular members, a rotating earth engaging member journaled in said reciprocating bar, means for normally holding said reciprocating bar in a lowered position, and means for locking said reciprocating bar in a raised position.

3. In an anti-skidding device of the character described, a hub structure adapted to fit over the hub of a vehicle, a pair of oppositely extending tubular members, a spring arranged in each of said tubular members, a steadying bar adapted to be connected to the vehicle, said steadying bar extending into the upper part of said tubular members, whereby said hub structure and said tubular members are prevented from rotating, said lower tubular member being provided with a longitudinal slot, a reciprocating bar arranged in said lower tubular member, a lug extending from said bar through the slot in said tubular member, whereby said bar is prevented further rotation, a rotatable earth engaging member mounted on said reciprocating bar, a bracing member mounted on said reciprocating bar, and a locking catch adapted to engage said lug for locking said bar and the various parts connected therewith in an elevated position.

In testimony whereof I have signed my name to this specification in the presence of two subscribing witnesses.

JOHN VADAY

Witnesses:
C. OSGOOD PADDON,
JAMES F. RANSOM.